United States Patent [19]

Takahashi et al.

[11] Patent Number: 4,499,580
[45] Date of Patent: Feb. 12, 1985

[54] OUTPUT CHECK APPARATUS FOR ELECTROPHOTOGRAPHIC COPIER

[75] Inventors: Izumi Takahashi; Kenichiro Nakayama; Terumasa Sugiyama; Takanobu Suzuki, all of Kanagawa, Japan

[73] Assignee: Fuji Xerox Co., Ltd., Tokyo, Japan

[21] Appl. No.: 398,150

[22] Filed: Jul. 14, 1982

[30] Foreign Application Priority Data

Jul. 15, 1981 [JP] Japan ................... 56-109220

[51] Int. Cl.³ ............................. G06F 11/00
[52] U.S. Cl. .................... 371/17; 324/73 R; 371/20
[58] Field of Search ............ 371/17, 18, 20, 72; 324/73 R, 73 AT; 355/14 C; 364/580

[56] References Cited

U.S. PATENT DOCUMENTS

| | | | |
|---|---|---|---|
| 3,659,273 | 4/1972 | Knauft et al. | 371/17 |
| 4,200,224 | 4/1980 | Flint | 371/20 |
| 4,334,308 | 6/1982 | Thinschmidt et al. | 371/17 |

*Primary Examiner*—Jerry Smith
*Assistant Examiner*—Mark Ungerman
*Attorney, Agent, or Firm*—Sughrue, Mion, Zinn, Macpeak, and Seas

[57] ABSTRACT

A checking apparatus for a copier includes check drive circuits having functions indentical to that of load driving circuits normally operated by a controller. The load driving circuits are bypassed in the check mode so that the loads are selectively operated by the check drive circuits, to test the output of a microprocessor or like device serving as a controller.

4 Claims, 3 Drawing Figures

corresponding to the above output points $TP_1$, which are electrically connected to the outputs of the drive circuits 6, 7.

OUTPUT CHECK APPARATUS FOR ELECTROPHOTOGRAPHIC COPIER

BACKGROUND OF THE INVENTION

This invention relates to an output check apparatus for a copier, capable of easily checking whether or not signals input and output of a control portion are normal.

Conventionally, in an output check method for an electrophotographic copier where a microprocessor is adopted for use in the control portion, software for the check is drawn up beforehand and the software is executed at the time of checking so as to check the input/output; or whether the signals are normal or not is checked by individually checking each control system controlled by signals from a sensor group for inputting a signal to the control portion, and the control portion itself. But as the former method requires a large memory capacity, with a controller using a one-chip microprocessor, it is difficult to execute. If more memories are to be installed for checking, the device becomes expensive, which inconveniently causes an increase in the cost of the copier. The disadvantage of the latter method is that the check portions are investigated beforehand using a circuit diagram or a manual, and the drive circuits are individually shorted, such that much time and labor is required to check the operating condition.

SUMMARY OF THE INVENTION

It is an object of this invention to overcome the above disadvantages and to provide an output check apparatus for an electrophotographic copier having drive circuits, wherein an input/output signal is judged, with a load operated, whereby the operation of each portion can be efficiently checked in a short time.

DETAILED DESCRIPTION OF THE PREFERRED EMBODIMENTS

Figure 1:
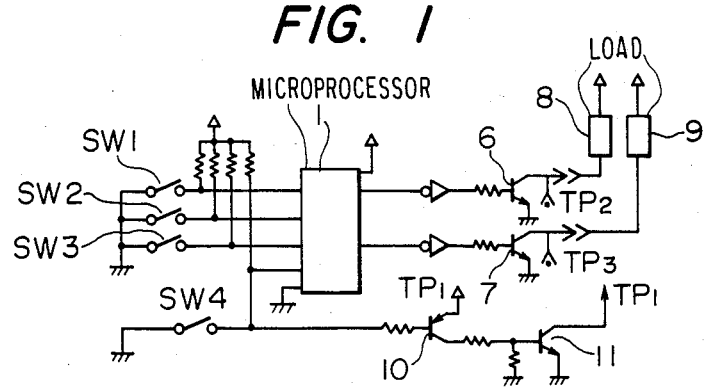
FIG. 1 is a circuit diagram of one embodiment of the present invention.
Figure 2:
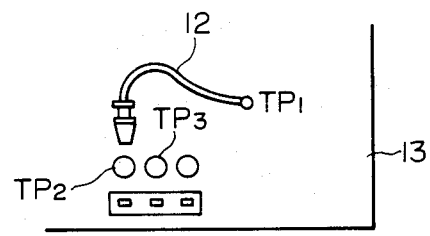
FIG. 2 is a front view showing a part of a base plate.
Figure 3:
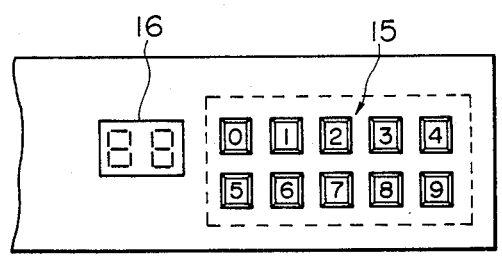
FIG. 3 is a front view of a console panel.

The invention will now be described by way of a preferred embodiment thereof, as illustrated in the accompanying drawings. FIG. 1 illustrates the control system of an electrophotographic copier. The control portion comprises a one-chip microprocessor 1, in which the operating conditions of each portion are input from sensor groups $s\omega_1$, $s\omega_2$ and $s\omega_3$ mounted at each portion of the copier. Various loads 8, 9 are attached to the output of the microprocessor 1 through drive circuits 6, 7, the operation being controlled by an output signal of the microprocessor 1 by way of the drive circuits 6, 7.

A test switch $s\omega_4$ is connected to one input of the above microprocessor 1. When the test switch $s\omega_4$ is turned on, the input/output of the microprocessor 1 goes into a check mode and check drive circuits 10, 11 are rendered operational. The above check drive circuits 10, 11 are composed of equivalent circuits of the driving circuits 6, 7 for driving the loads 8, 9, the outputs of the check drive circuits 10, 11 being respectively provided with output points $TP_1$, $TP_1$ to which one end of a check point short wire 12 can be connected. A base plate 13, to which the above microprocessor 1 is fixed, Thus, in checking the input/output, first a copy set number display device 16 is set to '0' by a key 15 on a console panel 14, and then the test switch $s\omega_4$ is turned on, whereby the input/output state of the microprocessor 1 is switched to a check mode to check input signals input from each sensor group $s\omega_1$ ... etc. If there is no abnormality, the copy set number display device 16 is advanced, to give an indication as to whether or not the input signal is normal. In checking the output of the microprocessor 1, the check point short wire 12, one end of which is connected to the output points $TP_1$, is sequentially connected to the check points $TP_2$ ... etc., on the base 13 at the other end thereof, whereby, since each load is operated while the check drive circuits 10, 11 connect the check point short wire 12 to the check points $TP_2$, etc., the output condition can be checked by observing this operation condition.

In the above embodiment, the check point short wire 12 is used as a checking means, but a selection method using connectors or the like is also applicable. The test switch $s\omega_4$ is adapted to effect change-over to the checking mode. When the copy set number display device 16 is set to '0' by the keyboard 15, a test mode is established, and thereafter the display device 16 is advanced according to operations of the sensor groups $s\omega_1$ ... etc. At this time, if all the outputs are adapted to be off, and the check drive circuit is adapted to operate only during the check mode, when the test switch $s\omega_4$ is turned on by mistake during copying, the operation of the check drive circuits can be avoided.

It will be apparent that the invention, as described above, achieves a checking apparatus capable of simply checking the operating condition of each load in the copier device by providing a check drive circuit having the same functions as the drive circuits for driving the loads. Since the output can be easily checked in a short time without the need of a memory, the apparatus can be offered at a low cost, as compared with the conventional device executing a check mode via software. Of course, the output of the control system can be checked, and simultaneously the load can be checked for normal operation, so that inspection for and repair of problems can be made in a short period of time.

What is claimed is:

1. Test apparatus for use with an electrophotographic copier control system comprising; sensor means in said copier, a controller receiving inputs from said sensor means and generating outputs for driving plural loads via drive circuits, means for switching said controller to a check mode, check drive circuits having equivalent circuits as said drive circuits, and means for selectively coupling said check drive circuits to said loads, to thereby check the output of said controller.

2. A device as claimed in claim 1, said check drive circuits being coupled to said means for switching said controller.

3. A device as claimed in claims 1 or 2, wherein said means for selectively coupling comprises a check point short wire connecting outputs of said check drive circuits to inputs of selected loads.

4. A device as claimed in claim 3, further including a base plate including means electrically connected to each said load, and said check point short wire being selectively sequentially connected thereto.

* * * * *